US012327094B2

(12) United States Patent
Chen et al.

(10) Patent No.: US 12,327,094 B2
(45) Date of Patent: Jun. 10, 2025

(54) VISUAL SCRIPTING PROGRAM WITH SELECTABLE REROUTE NODE ICON

(71) Applicant: Lemon Inc., Grand Cayman (KY)

(72) Inventors: Guan-Bai Chen, Culver City, CA (US); Runze Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 252 days.

(21) Appl. No.: 18/063,636

(22) Filed: Dec. 8, 2022

(65) Prior Publication Data
US 2024/0192928 A1 Jun. 13, 2024

(51) Int. Cl.
G06F 8/34 (2018.01)
G06F 3/04817 (2022.01)
G06F 3/0486 (2013.01)
G06T 11/00 (2006.01)
G06F 3/0482 (2013.01)

(52) U.S. Cl.
CPC ............ *G06F 8/34* (2013.01); *G06F 3/04817* (2013.01); *G06F 3/0486* (2013.01); *G06T 11/00* (2013.01); *G06F 3/0482* (2013.01)

(58) Field of Classification Search
CPC ...... G06F 8/34; G06F 3/04817; G06F 3/0486; G06F 3/0482; G06T 11/00
See application file for complete search history.

(56) References Cited

U.S. PATENT DOCUMENTS 4,914,568 A * 4/1990 Kodosky ................. G06F 30/20
703/2
7,146,347 B1 * 12/2006 Vazquez ................... G06F 8/34
706/12

(Continued)

FOREIGN PATENT DOCUMENTS

EP 0809213 A2 * 11/1997
EP 2293175 A2 * 3/2011 ............. B60K 35/00

(Continued)

OTHER PUBLICATIONS

LabView Wiki, Boolean Controls, available at https://labviewwiki.org/wiki/Boolean_controls (last accessed Oct. 13, 2024) (Year: 2019).*

(Continued)

*Primary Examiner* — Shahid K Khan
(74) *Attorney, Agent, or Firm* — Alleman Hall & Tuttle LLP

(57) ABSTRACT

A computing device is provided, including a processor configured to execute a visual scripting program. The processor is further configured to display a graphical user interface (GUI) of the visual scripting program, which is configured to display a plurality of nodes that are connectable by graphical wires that represent dataflow between the nodes. The GUI includes a selectable reroute node icon that enables connection of one node of the plurality of nodes to one or more other nodes of the plurality of nodes via one of the graphical wires. The selectable reroute node icon includes a left end and a right end, in which each end includes a selectable region that has a width that is at least one third of a total width of the selectable reroute node icon, and the left and right side selectable regions together occupy at least 35% of a total area of the icon.

15 Claims, 8 Drawing Sheets

(56) References Cited

U.S. PATENT DOCUMENTS

| | | | | |
|---|---|---|---|---|
| 7,777,783 | B1* | 8/2010 | Chin | H04N 23/90 348/211.99 |
| 8,225,282 | B1* | 7/2012 | Massoudi | G06F 8/31 717/121 |
| 9,244,562 | B1* | 1/2016 | Rosenberg | G06F 3/04883 |
| 2002/0140707 | A1* | 10/2002 | Samra | G06F 3/0484 345/619 |
| 2003/0231205 | A1* | 12/2003 | Shima | H04N 21/4438 715/744 |
| 2005/0065970 | A1* | 3/2005 | King | G06F 8/34 707/999.102 |
| 2008/0034079 | A1* | 2/2008 | Kodosky | G06F 3/0484 715/771 |
| 2008/0034297 | A1* | 2/2008 | Correll | G06F 8/34 715/763 |
| 2008/0034298 | A1* | 2/2008 | Kodosky | G06F 8/34 715/763 |
| 2008/0098349 | A1* | 4/2008 | Lin | G06F 8/10 717/106 |
| 2008/0168403 | A1* | 7/2008 | Westerman | G06F 3/0488 715/863 |
| 2008/0209392 | A1* | 8/2008 | Able | G06F 8/34 717/105 |
| 2008/0307332 | A1* | 12/2008 | Hayles | G06F 3/04817 715/764 |
| 2009/0228830 | A1* | 9/2009 | Herz | G06F 16/26 707/999.005 |
| 2012/0084695 | A1* | 4/2012 | Higgins | G06F 8/33 715/771 |
| 2013/0019173 | A1* | 1/2013 | Kotler | G06F 3/04883 715/834 |
| 2013/0031501 | A1* | 1/2013 | Kodosky | G06F 3/04842 715/771 |
| 2014/0040798 | A1* | 2/2014 | Kodosky | G06F 3/0481 715/765 |
| 2016/0034617 | A1* | 2/2016 | Caltagirone | G06F 30/331 703/13 |
| 2016/0092817 | A1* | 3/2016 | Graham | G06F 3/0482 705/7.26 |
| 2017/0052678 | A1* | 2/2017 | Karasawa | G06F 3/0482 |
| 2017/0257283 | A1* | 9/2017 | O'Malley | H04L 41/12 |
| 2017/0300303 | A1 | 10/2017 | Kodaganur et al. | |
| 2018/0173576 | A1* | 6/2018 | Muro | G05B 15/02 |
| 2018/0321830 | A1* | 11/2018 | Calhoun | G06F 8/38 |
| 2019/0163694 | A1* | 5/2019 | Yao | G06F 16/338 |
| 2019/0166069 | A1* | 5/2019 | Yao | G06N 20/00 |
| 2023/0085946 | A1* | 3/2023 | Nolan | G06F 9/54 715/700 |
| 2023/0161596 | A1* | 5/2023 | Vadapandeshwara | G06F 8/35 712/214 |

FOREIGN PATENT DOCUMENTS

| | | | | |
|---|---|---|---|---|
| KR | 20120049389 A | * | 5/2012 | |
| WO | WO-2017059684 A1 | * | 4/2017 | A63F 13/214 |

OTHER PUBLICATIONS

"Feature Request: Visual scripting—Bolt—Reroute Node," Unity, Available Online at forum.unity.com/threads/visual-scripting-bolt-reroute-node. 1013590, Nov. 28, 2020, 3 pages.

ISA Intellectual Property Office of Singapore, International Search Report Issued in Application No. PCT/SG2023/050815, Apr. 12, 2024, WIPO, 4 pages.

Miroliubov, A., "Visual Programming—An Alternative Way of Developing Software," Bachelor of Engineering Thesis, Metropolia University of Applied Sciences, Mar. 17, 2018, 42 pages.

"3.0 Released!," GitHub, Available Online at github.com/RealityStop/Bolt.Addons.Community/releases/tag/3.0, Nov. 2, 2020, 9 pages.

* cited by examiner

VISUAL SCRIPTING PROGRAM WITH SELECTABLE REROUTE NODE ICON

BACKGROUND

A visual scripting program is a convenient tool that enables a user to develop programs via node-based block diagrams using a graphical user interface. By arranging the nodes, selecting program logic to run within each node, and connecting the inputs and outputs of the nodes together via graphical wires, the user can use the visual scripting program to generate a script, which can be exported to a different software environment for execution. Visual scripting programs can enable novice users who are not familiar with the details of coding in the scripting language to easily develop scripts. Visual scripting programs are commonly used for developing games and adding visual effects to content such as videos. These programs typically have graphical user interfaces that include nodes that are connected via graphical wires. As a user builds the system, the user often rearranges the nodes on the graphical user interface, for example to make room for new nodes that are added. Many visual scripting languages automatically move the graphical wires connecting the nodes when the nodes themselves are moved by a user. However, the placement of the wires determined automatically by the visual scripting program can be undesirable, appearing cluttered or difficult to see, or taking up too much space on the screen, for example. In such a situation, the user may desire to change the location of the wires. For this purpose, a special type of node referred to as a reroute node is provided. The reroute node enables a user to reroute the graphical wires as the user prefers, for example by moving a point on the wires to a new location, inserting a branch point in a wire, etc. However, conventional reroute nodes are displayed as small circular pins on the wires between the nodes, and can be difficult for users to see and interact with to execute the various functions of the reroute nodes. For experienced users, the user may be forced to attempt a particular user input several times. For novice users, the user may not appreciate the functionality of the conventional reroute node upon visual inspection. This can lead to user frustration, ergonomic strain due to repeated input attempts, and decreased productivity.

SUMMARY

To address the issues discussed herein, computing devices and methods for displaying a graphical user interface (GUI) including a selectable reroute node icon are provided. In one aspect, a computing device is provided that includes a processor and associated memory storing instructions that cause the processor to execute a visual scripting program. The processor configured to display the GUI of the visual scripting program on a display device associated with the computing device. The GUI is configured to display a plurality of nodes that include scripting logic, the nodes are connectable by graphical wires that represent dataflow or execution flow between the nodes. The graphical user interface includes a selectable reroute node icon that enables connection of one node of the plurality of nodes to one or more other nodes of the plurality of nodes via one of the graphical wires. The selectable reroute node icon includes a left end and a right end, the left end including a left side selectable region that has a width that is at least one third of a total width of the selectable reroute node icon, the right end including a right side selectable region that has a width that is at least one third of the total width of the selectable reroute node icon, and the left side selectable region and right side selectable region together occupy at least 35% of a total area of the selectable reroute node icon.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
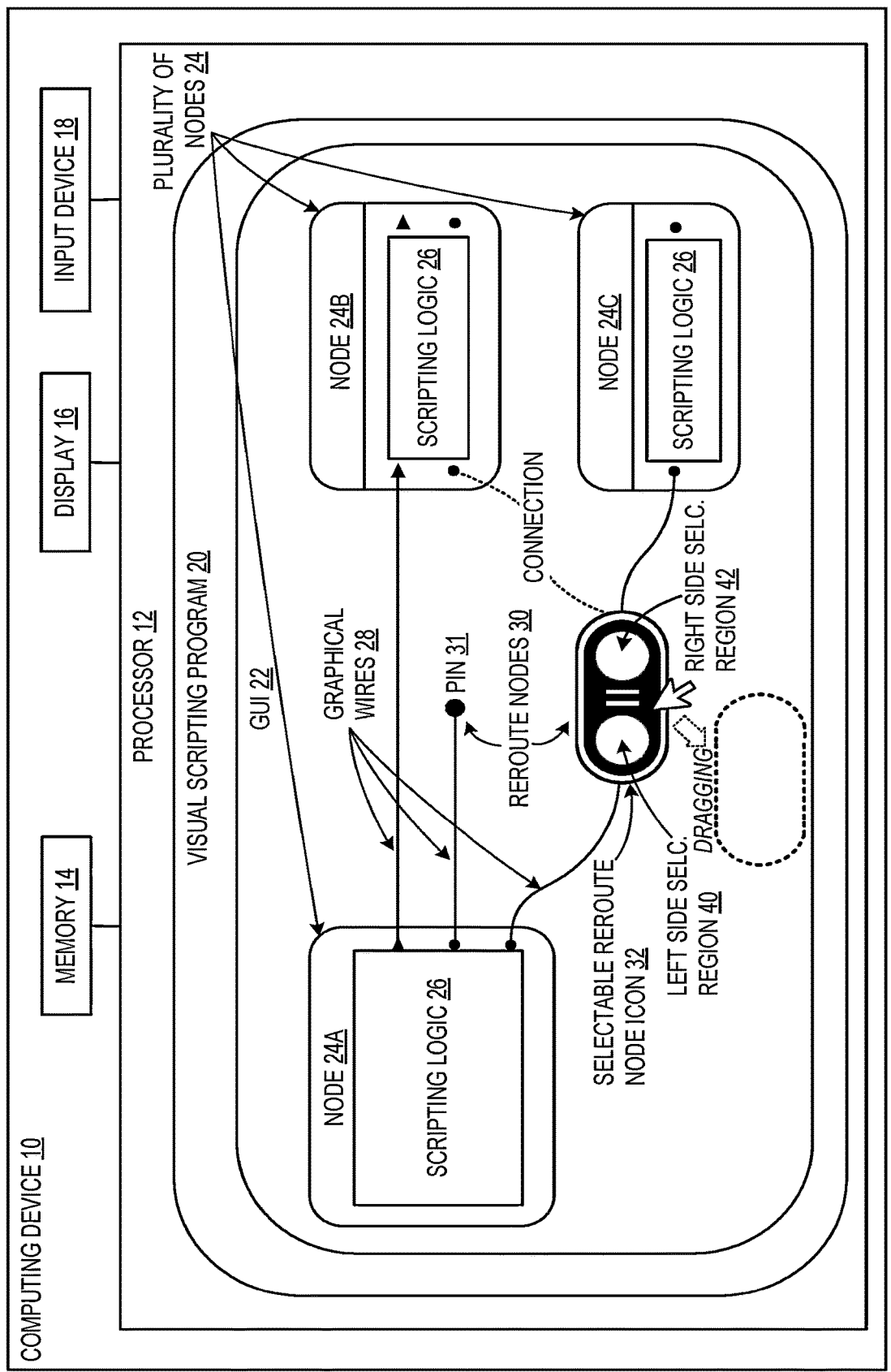
FIG. 1 is a schematic diagram of a computing device including a processor configured to execute a visual scripting program and display a graphical user interface (GUI) of the visual scripting program according to an embodiment of the present disclosure.

As schematically illustrated in FIG. 1, to address the issues identified above, a computing device 10 for displaying a GUI 22 including a selectable reroute node icon is provided. FIG. 1 illustrates a schematic view of an example computing device 10 including a processor 12 configured to execute a visual scripting program 20 and display the GUI 22 of the visual scripting program 20 according to the present disclosure. Continuing with FIG. 1, the computing device 10 may include associated memory 14 storing instructions to implement visual scripting program 20 via the processor 12, a display 16, and at least one input device 18 of a suitable type, such as a keyboard, mouse, touchscreen, etc., for receiving user input from a user. For example, the computing device 10 may be any of a variety of types of computing devices, such as laptop, desktop, server, or mobile computing devices such as a handheld tablet or smartphone device.

First, a user runs the visual scripting program 20 using the computing device 10. The program 20 may be installed on computing device 10 or may be installed on a remote server and accessed using computing device 10, for example. The processor 12 may be configured to execute the visual scripting program 20 and display the GUI 22 of the visual scripting program 20. The visual scripting program 20 is a software tool that uses a graphical interface to help the user create programs based on visual representations of scripting logic. Programming in such a visual scripting interface is performed by specifying the scripting logic of in each of a plurality of blocks, called nodes, using aids such as pop-up menus, text editors, etc., and then connecting the nodes of scripting logic. A connection between the nodes is made by connecting a port from one node to a compatible port on another node, using the input device 18 such as a mouse. Visual scripting program 20 has different node types, including events, flow, and data.

The visual scripting program 20 may be utilized to for a variety of purposes. In one specific use case scenario, the visual scripting program 20 is configured to add effects to digital content such as images and videos. In one example, the effects are augmented reality (AR) effects added to sharable AR videos, such as image overlays on a camera feed to enable a user to capture a video of their face in a picture, etc. Accordingly, the program 20 may be configured to receive an input image, process the input image according to a script generated by the visual scripting program 20 to add AR effects to the image to thereby produce a modified image, and output the modified image. The GUI 22 of the program 20 may be configured to display a plurality of nodes 24 (24A, 24B, 24C . . . ) that are configured to include scripting logic 26. The nodes 24 are connectable by graphical wires 28 representing dataflow or execution flow between the nodes 24.

Continuing with FIG. 1, the GUI 22 includes reroute nodes 30 that allow a user to move the wires 28 around or connect one node to a new node. As discussed further below, the reroute nodes 30 may be displayed as a small circular pin 31 or as a selectable reroute node icon 32 that enables connection of one node of the plurality of nodes 24 to one or more other nodes of the plurality of nodes 24 via one of the graphical wires 28. Transitions between these two icon forms for the reroute nodes 30 will be explained below in relation to FIG. 2. The selectable reroute node icon 32 may be further configured to enable dragging of the graphical wires 28 connecting the one node to the one or more other nodes as shown by graphical cursor dragging the graphical wire 28 in the direction of the dashed arrow to a new location indicated in dashed lines.

Figure 2:
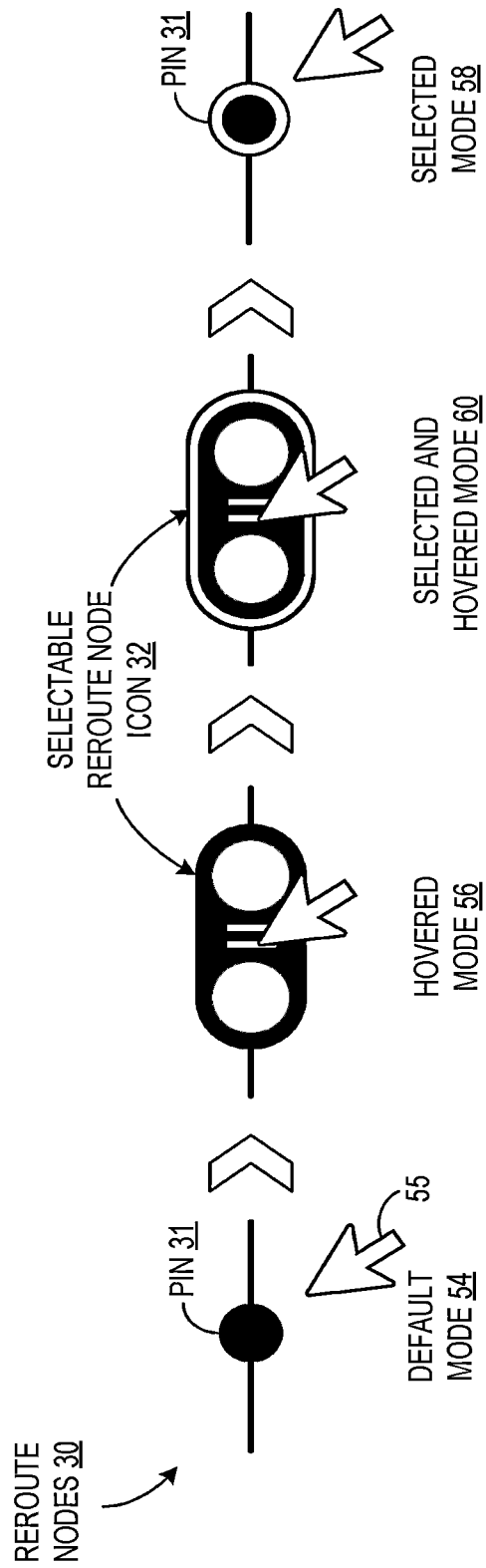
FIG. 2 illustrates example reroute nodes including the selectable reroute node icon of the GUI of FIG. 1 in different interaction modes.

FIG. 2 illustrates the reroute nodes 30 including the selectable reroute node icon 32 in different interaction modes. The interaction modes of the reroute nodes 30 may include a default mode 54, a hovered mode 56, a selected mode 58, and selected and hovered mode 60, as shown at FIG. 2. In the default mode 54, the reroute node 30 may be displayed as a small circular pin. Although a circular pin is shown, other shapes such as a square or diamond pin may alternatively be used. The default mode 54 is displayed when the reroute node 30 is not selected, and the cursor 55 is not hovering over the reroute node 30. To transition to the hovered mode 56, the reroute node 30 may be expanded and displayed as the selectable reroute node icon 32 by hovering the cursor 55 over the small pin of the default mode 54. The selectable reroute node icon 32 is between 1.5 and 2.5 times as tall as the circular pin and between 3 and 5 times as long, and has rounded lateral edges with straight top and bottom sides generally forming an elongated over or pill shape. To transition to the selected and hovered mode 60 from the hovered mode 56, the reroute node 30 merely needs to be clicked by the user. To transition to the selected and hovered mode 60 from the default mode 54, the user can select the pin 31 via hovering over the pin 31 with the cursor, which will cause display of the hovered mode 56, and then click the selectable reroute node icon 32 in the hovered mode 56. In the selected and hovered mode, an outline is displayed around the selectable reroute node icon 32. The outline is shown as white surrounding a black interior region; however, it will be appreciated that these colors are merely exemplary and the outline may be any graphically color or shade distinguishable color or shade that is distinguishable from the interior of the selectable reroute node icon 32. To transition to the selected mode 58, the user may cease hovering over selectable reroute node icon 32 in the selected and hovered mode 60 after the selectable reroute node icon 32 has been clicked (i.e., while the outline is displayed), which will cause the selectable reroute node icon 32 to cease being displayed and the pin 31 to be displayed in the selected mode 58. In the selected mode 58, an outline is displayed around the circular pin, which may be white or other graphically distinguishable color or shade. In this manner, the user may visually ascertain the mode of operation of the reroute node 30. While both the pin 31 in the default mode 54 and the selectable reroute node icon 32 may function as the reroute nodes 30, enabling moving of the wires 28 and adding a new connection to the nodes 24, the selectable reroute node icon 32 can be utilized more intuitively as described below.

Figure 3:
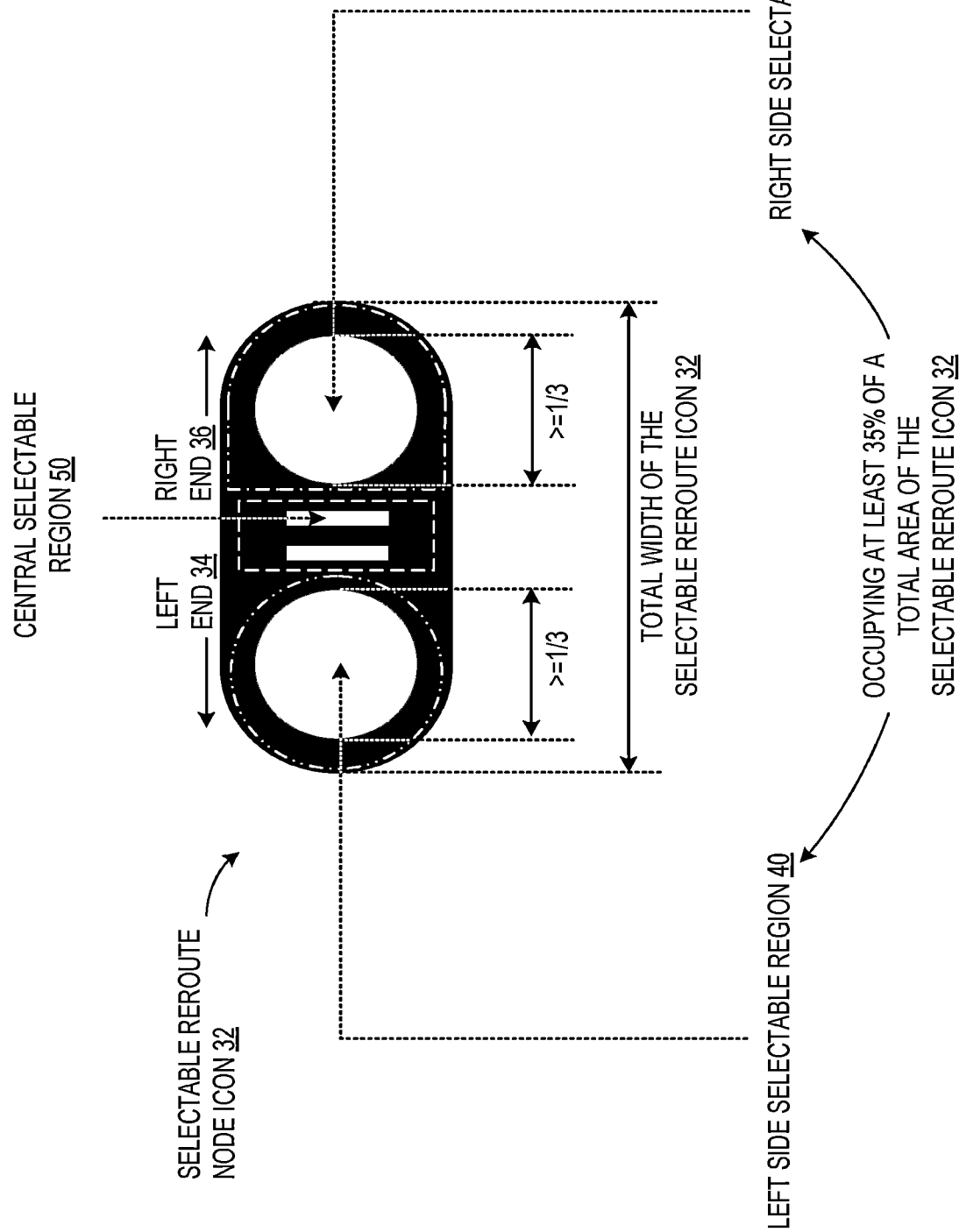
FIG. 3 illustrates an example selectable reroute node icon of the GUI of the computing device of FIG. 1.

FIG. 3 illustrates the selectable reroute node icon 32 of the GUI 22 of the computing device 10 of FIG. 1. As shown at FIG. 3, the selectable reroute node 32 icon may be pill shaped. Alternatively, the selectable reroute node 32 icon may be rectangularly shaped or circularly shaped. Continuing with FIG. 3, the selectable reroute node icon 32 may include a left end 34 and a right end 36, in which the left end 34 includes a left side selectable region 40 and the right end 36 includes a right side selectable region 42. The left side selectable region 40 and the right side selectable region 42 may be circular regions, as shown by the white circles in FIG. 3. Alternatively, the left and right side selectable regions 40, 42 may be feature more complex shapes, such as the D-shaped region shown in dot dash lines. As another alternatively, the circular region encompassed by the left or right side selectable region may be a larger circle extending nearly to completely to the perimeter of the icon, as shown in double dot dash lines. It will be appreciated that the left side selectable region 40 has a width that is at least one third of the total width of the selectable reroute node icon 32, and the right side selectable region 42 has a width that is at least one third of the total width of the selectable reroute node icon 32, as shown at FIG. 3. A wide width such as this has the technical benefit of being easy to select by a user with a cursor or tap. Moreover, the left side selectable region 40 and right side selectable region 42 together may occupy at least 35% of a total area of the selectable reroute node icon 32. The left side selectable region 40 and right side selectable region 42 may together occupy less than 75%, or in some embodiments less than 85%, of the total area of the selectable reroute node icon 32, to allow room for the central selectable region 50. A large area in the range of 35 to 75% or 85% such as this also has the technical benefit of being easy to select by a user with a cursor or tap. Furthermore, the left side selectable region 40 may have a height that is at least two thirds of the total height of the selectable reroute node icon 32, and the right side selectable region 42 may have a height that is at least two third of the total height of the selectable reroute node icon 32. A tall height such as this also has the technical benefit of being easy to select by a user with a cursor or tap. These configurations ensure that these selectable areas are sufficiently large such that the user is easily able to select the left side selectable region 40 and right side selectable region 42. Continuing with FIG. 3, the selectable reroute node icon 32 may further include a central selectable region 50, shown in dashed lines, laterally between the left side selectable region 40 and the right side selectable region 42, in which the central selectable region 50 may include a graphical symbol including one vertical bar or two vertical bars. Although the central selectable region is shown as being rectangular, other shapes may also be utilized for this region. It will be appreciated that other indicia may be provided as an alternative to the vertical bar or bars. The central selectable region 50 may be further configured to enable dragging of the wire or wires 28 (see FIG. 1) connecting the one node 24 to the one or more other nodes 24 (see FIG. 1) when a cursor is hovered over the region and a click and drag action is performed, as discussed further below.

Figure 4:
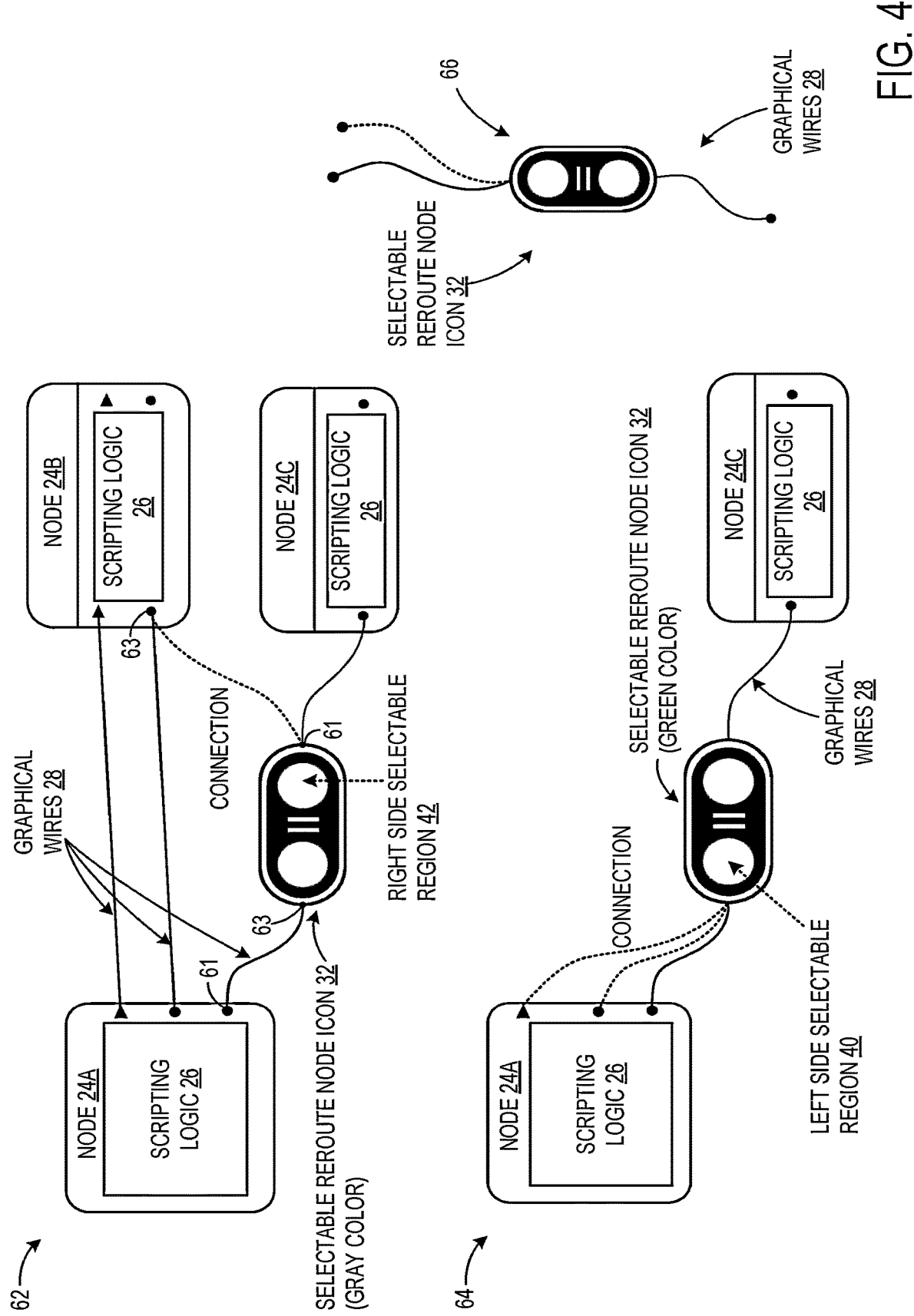
FIG. 4 illustrates a schematic view of creating a one-to-many connection via the selectable reroute node icon of the GUI of the computing device of FIG. 1.

FIG. 4 illustrates a schematic view of creating a one-to-many connection via the selectable reroute node icon 32 of the GUI 22 of the computing device 10 of FIG. 1. By manipulating the selectable reroute node icon 32, one node and one or more other nodes 24 may be connected via a one-to-many connection on the left end 34 or the right end 36 of the selectable reroute node icon 32 of the GUI 22 of the computing device 10 of FIG. 1. As shown at 62, for instance, when the node 24A and node 24C are connected via the graphical wire 28, the selectable reroute node icon 32 may be displayed on the graphical wire 28 between the node 24A and node 24C by hovering over the reroute node pin, and the right side selectable region 42 of the right end may be selected to make an additional connection (one-to-many) from a corresponding output port 61 on the right end of the icon 32 to a corresponding input port 63 of the node 24B. Furthermore, as shown at 64, the left side selectable region 42 of the left end may be selected to make an additional connection (one-to-many) from a corresponding input port 63 on the left end of the icon 32 to a corresponding output port 61 of the node 24A. Although the input port 63 and output port 61 are shown as small circles on the reroute node 30 in the top center of FIG. 4, these circles are for illustration purposes only as the ports on the reroute node are typically not graphically represented by graphical circles. For this reason, the circles for input and output ports on the reroute nodes are omitted in the remaining views.

Although shown as laterally elongated in the figures, it will be appreciated that the selectable reroute node icon 32 may be oriented vertically on the wires 28 and vertically elongated such that the corresponding input or output port may be positioned on the top and bottom side of the vertically oriented selectable reroute node icon 32, as shown at 66. Moreover, the selectable reroute node icon 32 of 62 and the selectable reroute node icon 32 of 64 may be displayed in a different color as discussed below. It will be appreciated that since the reroute node icon 32 may be oriented vertically, the left end described above may be referred to as a first end and the right end described above may be referred to as a second end, and the first end may correspond to the top end and the second end may correspond to the bottom end when oriented vertically. The left side selectable region may be referred to as a first side selectable region and may be positioned on the top end, in this vertically oriented configuration. Similarly, the right side selectable region may be referred to as a second side selectable region and may be positioned on the bottom end, in this vertically oriented configuration.

Figure 5:
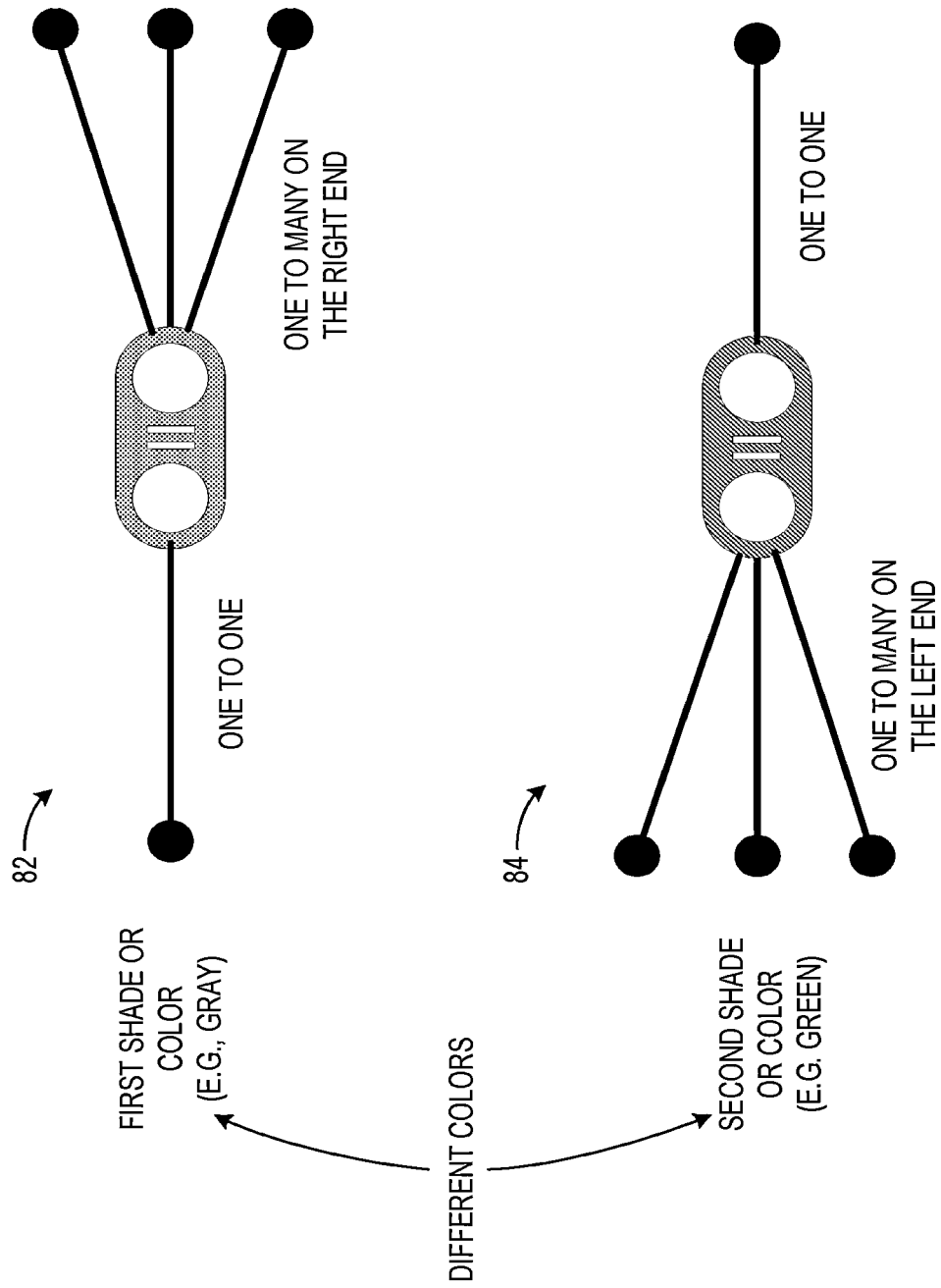
FIG. 5 illustrates the selectable reroute node icon displayed in a different color or shade depending whether the one-to-many connection is located on the left end or the right end of the selectable reroute node icon.

FIG. 5 illustrates the selectable reroute node icon 32 displayed in a different shade or color depending whether the one-to-many connection is located on the left end or the right end of the selectable reroute node icon 32. For example, as shown at 82, the selectable reroute node icon 32 including the connected graphical wires 28 may be displayed in a first color such as gray when the one-to-many connection is located on the right end of the selectable reroute node icon 32, while, as shown at 84, the selectable reroute node icon 32 including the connected graphical wires 28 may be displayed in a second color such as green when the one-to-many connection is located on the right end of the selectable reroute node icon 32. Alternatively, other visually contrasting shades or colors may be selected besides gray and green. This enables a user to easily identify whether the one-to-many connection can be created on the left or right side of the selectable reroute node icon 32.

Figure 6:
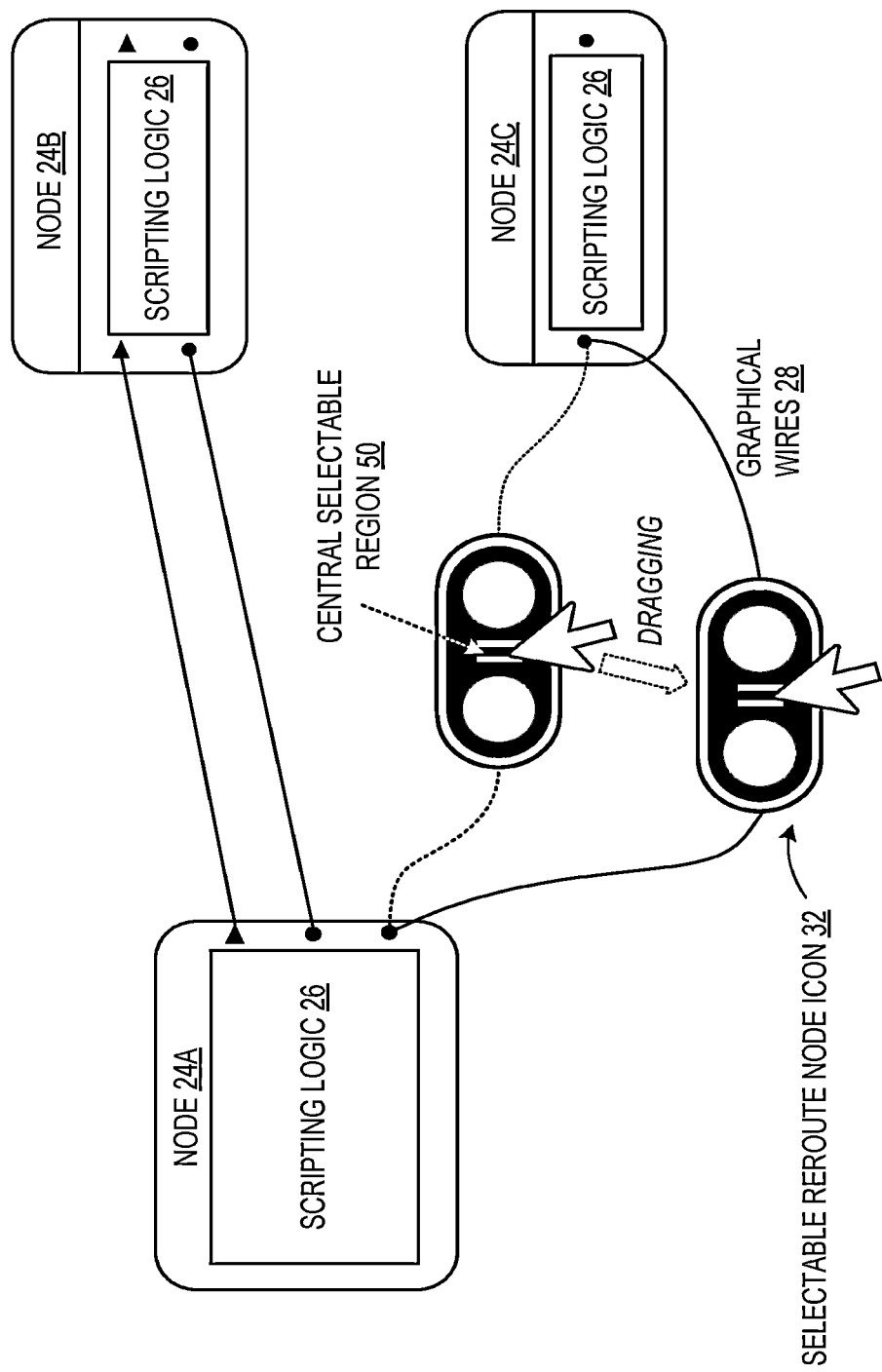
FIG. 6 illustrates a schematic view of dragging graphical wires between nodes via the selectable reroute node icon of the GUI of the computing device of FIG. 1.

FIG. 6 illustrates a schematic view of dragging graphical wires 28 between the nodes 24 via the selectable reroute node icon 32 of the GUI 22 of the computing device 10 of FIG. 1. The bars of the central selectable region 50 indicate that the graphical wires 28 are draggable within the GUI 22. As shown at FIG. 5, the graphical wires 28 between the nodes 24 may be dragged to a desired location by placing the cursor within the selectable reroute node icon 32 and holding and dragging the selectable reroute node icon 32 from a first location to a second location.

Figure 7:
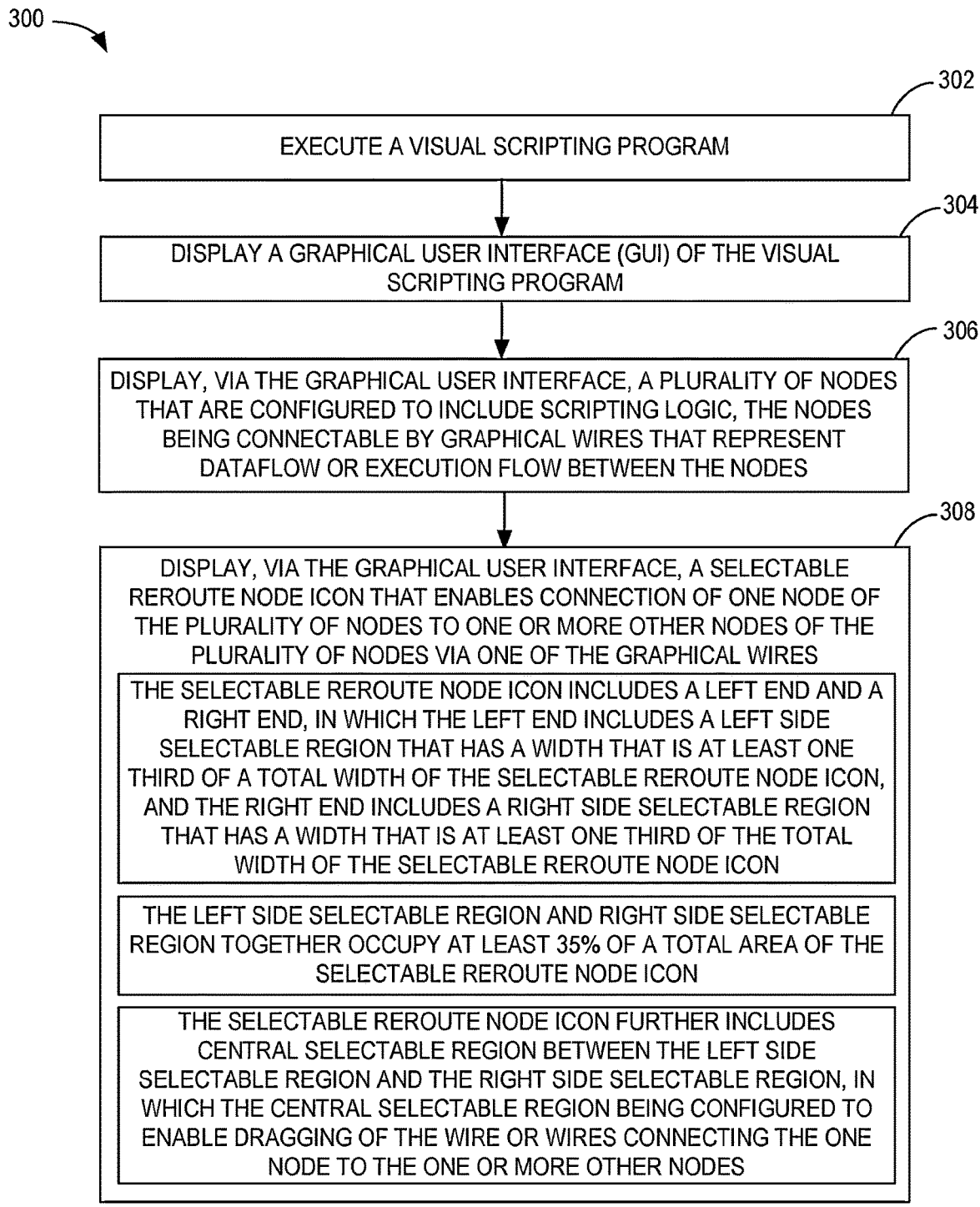
FIG. 7 shows a flowchart of a computerized method according to one example implementation of the computing device of FIG. 1.

FIG. 7 shows a flowchart of a computerized method 300 according to one example implementation. Method 300 may be implemented using hardware and software of the computing device of FIG. 1, or using other suitable hardware and software components. At step 302, the method may include executing a visual scripting program. At step 304, the method may further include displaying a graphical user interface (GUI) of the visual scripting program. At step 306, the method may further include displaying, via the graphical user interface, a plurality of nodes that are configured to include scripting logic, the nodes being connectable by graphical wires that represent dataflow or execution flow between the nodes. At step 308, the method may further include displaying, via the graphical user interface, a selectable reroute node icon that enables connection of one node of the plurality of nodes to one or more other nodes of the plurality of nodes via one of the graphical wires. The selectable reroute node icon may include a left end and a right end, in which the left end includes a left side selectable region that has a width that is at least one third of a total width of the selectable reroute node icon, and the right end includes a right side selectable region that has a width that is at least one third of the total width of the selectable reroute node icon, and left side selectable region and right side selectable region together may occupy at least 35% of a total area of the selectable reroute node icon. The selectable reroute node icon may further include central selectable region between the left side selectable region and the right side selectable region, the central selectable region being configured to enable dragging of the wire or wires connecting the one node to the one or more other nodes.

The above described systems and methods may be implemented to provide a reroute node icon that has improved visibility and improved functionality for users. The shape and size of the selectable regions provided within the reroute node promote sure interaction by the user, thereby increasing the accuracy of input. Increased accuracy of inputs decreases the need for users to re-apply inputs in repetitively, thereby achieving an economy of motion for the user.

In this way, the above described systems and methods promote both user ergonomics and user productivity.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
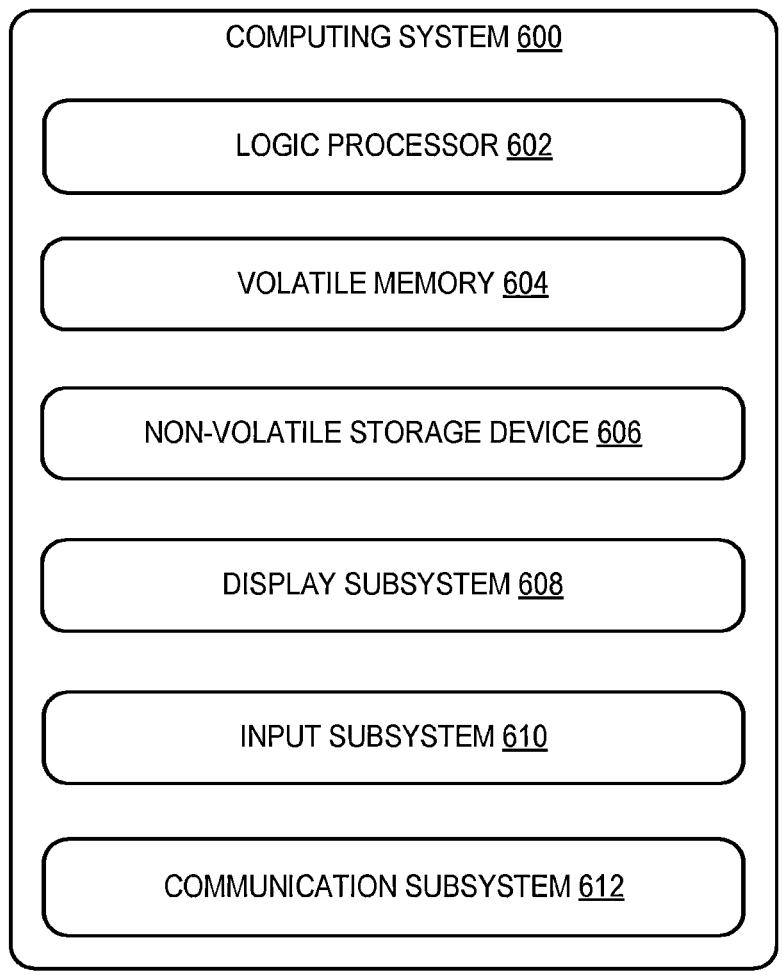
FIG. 8 shows a block diagram of an example computing system that may be utilized to implement the computing device of FIG. 1.

FIG. 8 schematically shows a non-limiting embodiment of a computing system 600 that can enact one or more of the methods and processes described above. Computing system 600 is shown in simplified form. Computing system 600 may embody the computer device 10 described above and illustrated in FIG. 2. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 8.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed e.g., to hold different data.

Non-volatile storage device 606 may include physical devices that are removable and/or built in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a computing device. The computing device may include a processor and associated memory storing instructions that cause the processor to execute a visual scripting program. The processor may be further configured to display a graphical user interface of the visual scripting program. The graphical user interface may be configured to display a plurality of nodes that are configured to include scripting logic, in which the nodes may be connectable by graphical wires that represent dataflow or execution flow between the nodes, and the graphical user interface may include a selectable reroute node icon that enables connection of one node of the plurality of nodes to one or more other nodes of the plurality of nodes via one of the graphical wires. The selectable reroute node icon may include a left end and a right end, the left end including a left side selectable region that has a width that is at least one third of a total width of the selectable reroute node icon, the right end including a right side selectable region that has a width that is at least one third of the total width of the selectable reroute node icon. Furthermore, the left side selectable region and right side selectable region together may occupy at least 35% of a total area of the selectable reroute node icon.

According to this aspect, the one node and the one or more other nodes may be connected via a one-to-many connection on the left end or the right end of the selectable reroute node icon.

According to this aspect, the selectable reroute node icon may be displayed in a different shade or color depending whether the one-to-many connection is located on the left end or the right end of the selectable reroute node icon.

According to this aspect, the selectable reroute node icon may further include central selectable region between the left side selectable region and the right side selectable region, the central selectable region being configured to enable dragging of the wire or wires connecting the one node to the one or more other nodes. The central selectable region may further include a graphical symbol including two vertical bars.

According to this aspect, the visual scripting program may be configured to receive an input image, process the input image according to a script generated by the visual scripting program to add augmented reality (AR) effects to the image to thereby produce a modified image, and output the modified image.

According to this aspect, the left side selectable region and the right side selectable region may be circular regions. Furthermore, the selectable reroute node icon may be pill shaped.

According to another aspect of the present disclosure, a computerized method is provided. The computerized method may include executing a visual scripting program. The computerized method may further include displaying a graphical user interface (GUI) of the visual scripting program. The computerized method may further include displaying, via the graphical user interface, a plurality of nodes that are configured to include scripting logic, in which the nodes may be connectable by graphical wires that represent dataflow or execution flow between the nodes. The computerized method may further include displaying, via the graphical user interface, a selectable reroute node icon that enables connection of one node of the plurality of nodes to one or more other nodes of the plurality of nodes via one of the graphical wires. The selectable reroute node icon may include a left end and a right end, the left end including a left side selectable region that has a width that is at least one third of a total width of the selectable reroute node icon, in which the right end may include a right side selectable region that has a width that is at least one third of the total width of the selectable reroute node icon, and the left side selectable region and right side selectable region together may occupy at least 35% of a total area of the selectable reroute node icon.

According to this aspect, the one node and the one or more other nodes may be connected via a one-to-many connection on the left end or the right end of the selectable reroute node icon.

According to this aspect, the selectable reroute node icon may be displayed in a different shade or color depending whether the one-to-many connection is located on the left end or the right end of the selectable reroute node icon.

According to this aspect, the selectable reroute node icon may further include central selectable region between the left side selectable region and the right side selectable region, in which the central selectable region may be configured to enable dragging of the wire or wires connecting the one node to the one or more other nodes.

According to this aspect, the central selectable region may include a graphical symbol including two vertical bars.

According to this aspect, the visual scripting program may be configured to receive an input image, process the input image according to a script generated by the visual scripting program to add augmented reality (AR) effects to the image to thereby produce a modified image, and output the modified image.

According to this aspect, the left side selectable region and the right side selectable region may be circular regions. Further, the selectable reroute node icon may be pill shaped.

According to another aspect of the present disclosure, a computer readable medium is provided. The computer readable medium may include instructions, when executed by a processor, causing the processor to execute steps of executing a visual scripting program. The steps may further include displaying a graphical user interface of the visual scripting program. The steps may further include displaying, via the graphical user interface, a plurality of nodes that are configured to include scripting logic, in which the nodes may be connectable by graphical wires that represent dataflow or execution flow between the nodes. The steps may further include displaying, via the graphical user interface, a selectable reroute node icon that enables connection of one node of the plurality of nodes to one or more other nodes of the plurality of nodes via one of the graphical wires. The selectable reroute node icon may include a first end and a second end, in which the first end may include a first side selectable region that has a width that is at least one third of a total width of the selectable reroute node icon, and the second end may include a second side selectable region that has a width that is at least one third of the total width of the selectable reroute node icon. Furthermore, the first side selectable region and second side selectable region together may occupy at least 35% of a total area of the selectable reroute node icon.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a processor and associated memory storing instructions that cause the processor to:
execute a visual scripting program; and
display a graphical user interface of the visual scripting program, the graphical user interface being configured to display a plurality of nodes that are configured to include scripting logic, the nodes being connectable by graphical wires that represent dataflow or execution flow between the nodes, the graphical user interface including a selectable reroute node icon that enables connection of one node of the plurality of nodes to one or more other nodes of the plurality of nodes via one of the graphical wires, wherein
the selectable reroute node icon includes a left end and a right end, the left end including a left side selectable region that has a width that is at least one third of a total width of the selectable reroute node icon, the right end including a right side selectable region that has a width that is at least one third of the total width of the selectable reroute node icon,
the left side selectable region and right side selectable region together occupy at least 35% of a total area of the selectable reroute node icon,
the one node and the one or more other nodes are connected via a one-to-many connection on the left end or the right end of the selectable reroute node icon, and
the selectable reroute node icon is displayed in a different shade or color depending whether the one-to-many connection is located on the left end or the right end of the selectable reroute node icon.

2. The computing device of claim 1, wherein the selectable reroute node icon further includes central selectable region between the left side selectable region and the right side selectable region, the central selectable region being configured to enable dragging of the wire or wires connecting the one node to the one or more other nodes.

3. The computing device of claim 2, wherein the central selectable region includes a graphical symbol including two vertical bars.

4. The computing device of claim 1, wherein the visual scripting program is configured to receive an input image, process the input image according to a script generated by the visual scripting program to add augmented reality (AR) effects to the image to thereby produce a modified image, and output the modified image.

5. The computing device of claim 1, wherein the left side selectable region and the right side selectable region are circular regions.

6. The computing device of claim 1, wherein the selectable reroute node icon is pill shaped.

7. A computerized method, comprising:
executing a visual scripting program;
displaying a graphical user interface (GUI) of the visual scripting program,
displaying, via the graphical user interface, a plurality of nodes that are configured to include scripting logic, the nodes being connectable by graphical wires that represent dataflow or execution flow between the nodes, and
displaying, via the graphical user interface, a selectable reroute node icon that enables connection of one node of the plurality of nodes to one or more other nodes of the plurality of nodes via one of the graphical wires, wherein
the selectable reroute node icon includes a left end and a right end, the left end including a left side selectable region that has a width that is at least one third of a total width of the selectable reroute node icon, the right end including a right side selectable region that has a width that is at least one third of the total width of the selectable reroute node icon,
the left side selectable region and right side selectable region together occupy at least 35% of a total area of the selectable reroute node icon,
the one node and the one or more other nodes are connected via a one-to-many connection on the left end or the right end of the selectable reroute node icon, and
the selectable reroute node icon is displayed in a different shade or color depending whether the one-to-many connection is located on the left end or the right end of the selectable reroute node icon.

8. The computerized method of claim 7, wherein the selectable reroute node icon further includes central selectable region between the left side selectable region and the right side selectable region, the central selectable region being configured to enable dragging of the wire or wires connecting the one node to the one or more other nodes.

9. The computerized method of claim 8, wherein the central selectable region includes a graphical symbol including two vertical bars.

10. The computerized method of claim 7, wherein the visual scripting program is configured to receive an input image, process the input image according to a script generated by the visual scripting program to add augmented reality (AR) effects to the image to thereby produce a modified image, and output the modified image.

11. The computerized method of claim 7, wherein the left side selectable region and the right side selectable region are circular regions.

12. The computerized method of claim 7, wherein the selectable reroute node icon is pill shaped.

13. A non-transitory computer readable medium including instructions stored thereon, the instructions, when executed by a processor, causing the processor to execute steps of:
executing a visual scripting program;
displaying a graphical user interface of the visual scripting program, displaying, via the graphical user interface, a plurality of nodes that are configured to include scripting logic, the nodes being connectable by graphical wires that represent dataflow or execution flow between the nodes, and displaying, via the graphical user interface, a selectable reroute node icon that enables connection of one node of the plurality of nodes to one or more other nodes of the plurality of nodes via one of the graphical wires, wherein the selectable reroute node icon includes a first end and a second end, the first end including a first side selectable region that has a width that is at least one third of a total width of the selectable reroute node icon, the second end including a second side selectable region that has a width that is at least one third of the total width of the selectable reroute node icon, the first side selectable region and second side selectable region together occupy at least 35% of a total area of the selectable reroute node icon, the one node and the one or more other nodes are connected via a one-to-many connection on the left end or the second end of the selectable reroute node icon, and the selectable reroute node icon is displayed in a different shade or color depending whether the one-to-many connection is located on the left end or the right end of the selectable reroute node icon.

14. The non-transitory computer readable medium of claim 13, wherein the selectable reroute node icon further includes central selectable region between the first side selectable region and the second side selectable region, the central selectable region being configured to enable dragging of the wire or wires connecting the one node to the one or more other nodes.

15. The non-transitory computer readable medium of claim 13, wherein the selectable reroute node icon is pill shaped.

* * * * *